(12) United States Patent
Taulbee

(10) Patent No.: US 7,152,838 B2
(45) Date of Patent: Dec. 26, 2006

(54) RECREATIONAL VEHICLE AWNING HOOK HANGER

(76) Inventor: James Earl Taulbee, 8580 Springbrook La., Portland, MI (US) 48875

( * ) Notice: Subject to any disclaimer, the term of this patent is extended or adjusted under 35 U.S.C. 154(b) by 0 days.

(21) Appl. No.: 10/774,036

(22) Filed: Feb. 6, 2004

(65) Prior Publication Data

US 2005/0173606 A1  Aug. 11, 2005

(51) Int. Cl.
*F16B 45/00* (2006.01)

(52) U.S. Cl. .................. 248/307; 248/304; 248/339; 248/340

(58) Field of Classification Search ............. 248/304, 248/307, 303, 301, 20.21, 339, 340, 341, 248/322

See application file for complete search history.

(56) References Cited

U.S. PATENT DOCUMENTS

| | | | | |
|---|---|---|---|---|
| 2,611,492 A | * | 9/1952 | Watts | 211/113 |
| 4,118,000 A | * | 10/1978 | Campbell | 248/227.4 |
| 4,226,394 A | * | 10/1980 | Einhorn | 248/223.41 |
| 4,282,630 A | * | 8/1981 | Toder | 16/93 D |
| 4,856,744 A | * | 8/1989 | Frankel | 248/215 |
| 5,174,536 A | | 12/1992 | Pelletier | |
| 5,180,223 A | | 1/1993 | McNamee | |
| 5,246,052 A | | 9/1993 | Homan | |
| 5,487,517 A | | 1/1996 | Smith | |
| 5,531,416 A | * | 7/1996 | Remmers | 248/222.51 |
| 5,560,574 A | * | 10/1996 | Vanderploeg | 248/222.11 |
| 5,601,267 A | | 2/1997 | Caine | |
| 6,109,579 A | * | 8/2000 | Huang | 248/294.1 |
| D461,704 S | | 8/2002 | Lelievre | |

\* cited by examiner

*Primary Examiner*—Amy J. Sterling
(74) *Attorney, Agent, or Firm*—Michael R. Kutas, Attorney; Michael R. Kutas

(57) ABSTRACT

An RV hook hanger to be used to display items from an awning roller rail. The RV hook hanger includes a top portion that has a substantially cylindrical cross section, mounted on a planar body. The top portion is provided to be accepted by the retainer channel on an awning roller rail. The planar body is attached to a bottom portion of the RV hook hanger. The bottom portion has a hook shaped end for receiving various types of attachments such as signs, lights or the like.

3 Claims, 4 Drawing Sheets

RECREATIONAL VEHICLE AWNING HOOK HANGER

CROSS-REFERENCE TO RELATED APPLICATIONS

None.

FEDERALLY SPONSORED RESEARCH

None.

SEQUENCE LISTING

None

FIELD OF INVENTION

The invention pertains to an RV awning hook hanger, and specifically to an improved hanger device designed to display objects from the utility channel of an awning roller rail of a recreational vehicle, camper, motor home, boat, house, commercial or other building.

BACKGROUND

The use of awnings for recreational vehicles, campers, motor homes, and boats; also awnings mounted to fixed structures such as a house or commercial buildings have become increasingly popular. Consumers desire for comfort, convenience, and the desire for a method to display objects or attachments on an awning roller rail. Several products have come to the market that enable the user to display objects from the awning roller rail. These products do not easily meet the needs of displaying objects on an awning roller rail without using secondary clips, hooks or clamps. The use of secondary clips, hooks or clamps makes the installation more time consuming, there are also more parts to store, lose or misplace. There are also added costs to manufacture, package, market, and maintain these items. I have listed two patents as examples 1 and 2 as my improvements on prior art.

Example 1: The AWNING HOOK FOR RECREATIONAL VEHICHLE in U.S. Pat. No. 5,174,536 to Ralf W. Pelletier: Ila Pelletier. This method requires use of secondary hardware to display an object from the awning roller rail with the disadvantages listed as the need to use a secondary slip or "S" hooks. The use of secondary slip hook or "S" hook makes the installation cumbersome and time consuming. There are also more parts to store, lose or misplace with added costs to manufacture, package, market, and maintain.

Example 2: The AWNING ROD BRACKET in U.S. Pat. No. 5,601,267 to Donald R. Caine. This example also requires use of secondary hardware to display an object from the awning roller rail with the disadvantages listed as the need to use a secondary slip or "S" hooks. The use of secondary slip hook or "S" hook makes the installation cumbersome and time consuming. There are also more parts to store, lose or misplace with added cost to manufacture, package, market, and maintain.

OBJECTS AND ADVANTAGES

Awnings are manufactured with two or more "C" shaped retainer channels that run the full length and parallel to the awning roller rail. One of the retainer channels is used to hold the awning fabric to the awning roller rail. Another retainer channel is used to hold the valance to the awning roller rail. In many cases the same channel is used for the attachment of the main awning fabric and the valance. One of the channels is called a utility channel. This channel is used to hold a deployment strap, also called a pull down strap. The deployment strap is used to pull the awning from a stored position to the open position. The deployment strap also allows users retract the awning in a controlled manner to the stored position, as the awning roller rail is tensioned or spring loaded. The deployment or pull down strap has a radial end to be accepted by the utility channel on the awning roller rail. The utility channel has an opening at one end of the awning roller rail to accept the deployment straps radial end. After opening the awning, the deployment straps radial end can be moved to the end of the awning roller rail and removed from the utility channel to be stored. With the awning in the open position and the deployment strap removed, the unused utility channel can be used to accommodate hanger devices. These hanger devices are designed to slide in the unused utility channel on the awning roller rail. The user slides an appropriate number of hangers into the utility channel on the awning roller rail. After the hangers are positioned or spaced in the utility channel, the user must then insert a hook, clip, or clamp into the awning hanger to hold the desired object.

With consumers desire for convenience, and the desire for a method to display objects on the awning roller rail. Several product have come to the market that enable the user to display rope lights, string lights, or other types of accent or ornamental lighting, also signs, banners, flags, windsocks or other objects from the awning roller rail. These products do not easily meet the needs of displaying objects on an awning roller rail without using a secondary clip, hook or clamp. The use of secondary clips, hooks or clamps makes the installation more time consuming, as well as there are also more parts to store, lose or misplace, with added cost to manufacture, package, and maintain.

I propose a new awning hook hanger design that eliminates the need to use secondary hardware to display objects from an awning roller rail. The clip's design will accommodate rope lights, string lights, or other types of accent or ornamental lighting, signs, banners, flags, windsocks, and other objects to the awning roller rail. The clip will be less expensive to manufacture, package, and ship, because no secondary hardware will be required. The consumer will have fewer parts to store, lose or misplace, and faster set up and take down of lights or other items. They are lightweight and being made of a weatherproof material, will last for years. Further objects and advantages of my invention will become apparent to those skilled in the art from a consideration of the drawings and ensuing description.

SUMMARY

The invention of the awning hook hanger was a result of the inventer's desire for a simpler, and less expensive method of an awning hanger device for displaying objects from an awning roller rail. The awning hook hanger has a hook shaped end to allow users to display items from the hook hanger on the awning roller rail without the use of secondary clip, hook, clamp or other hardware.

DRAWINGS-FIGURES

I have included four drawings as follows.

DRAWINGS-REFERENCE NUMBERS

Figure 1:
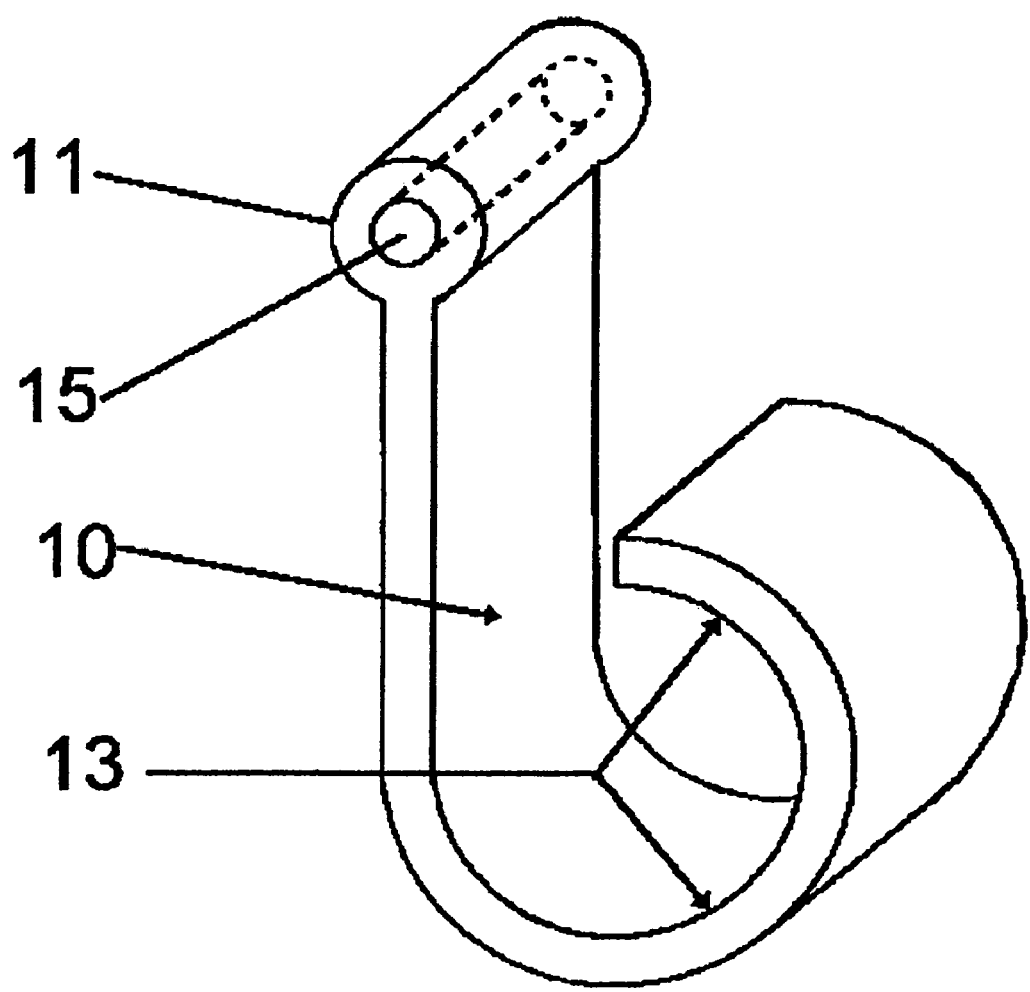
FIG. 1 is a planar view of the present invention.

10 RV awning hanger hook
11 Tubular body having a substantially circular cross-section
12 retainer channel of an awing roller rail
13 J-shaped body including a U-shaped cradle for receiving objects
14 Awning roller rail
15 core hole
16 Awning fabric

DETAILED DESCRIPTION-FIGURES

FIG. 1, is a preferred embodiment of the RV awning hook hanger of the present invention. The RV awning hook hanger 10 includes a body of J-shaped configuration having a first end and a second end including a U-shaped cradle for receiving objects thereon 13, and a tubular body having a substantially circular cross-section 11, fixedly and horizontally mounted to said first end of said J-shaped body. Said tubular body having a substantially circular cross-section 11 includes a core hole 15 to aid in the production molding process. Said J shaped body including a U-shaped cradle for receiving objects thereon 13 designed to allow users to display items from the RV awning hook hanger 10. The awning hook hanger 10 may be formed by injection molding as is conventional in the trade and can be manufactured from polyvinyl chloride, nylon or other suitable material. The molding material can include ultraviolet inhibitors that will enable the RV hook hangers to withstand outdoor use and last for many years.

Figure 2:
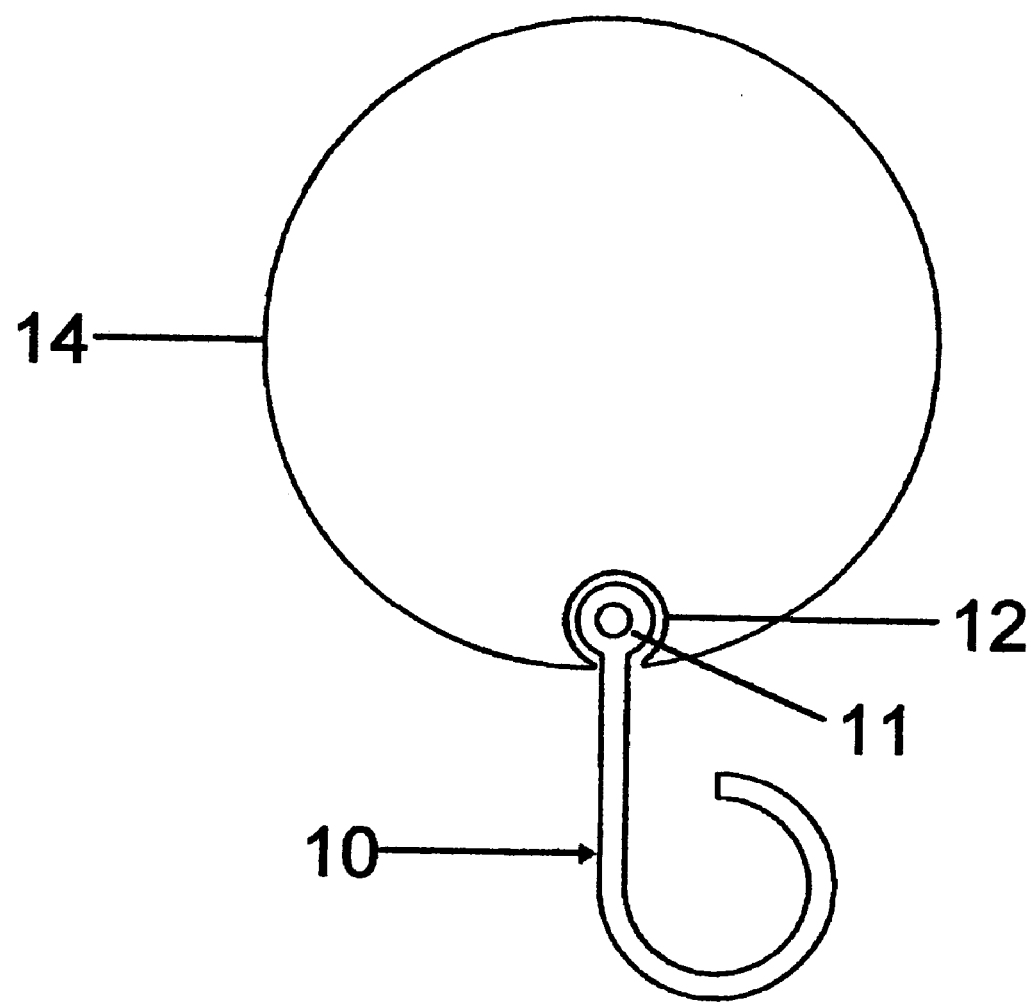
FIG. 2 is a side view of the present invention as inserted into an awning roller rail.

FIG. 2 illustrates a side view of the awning roller rail 14 with a RV hook hanger 10 installed. The awning roller rail 14 has a utility channel 12 that is designed by the awning manufacturer to accept articles with a substantially cylindrically circular cross-section. Said tubular body having a substantially circular cross-section 11 of the RV hook hanger 10 is manufactured to fit the utility channel 12.

Figure 3:
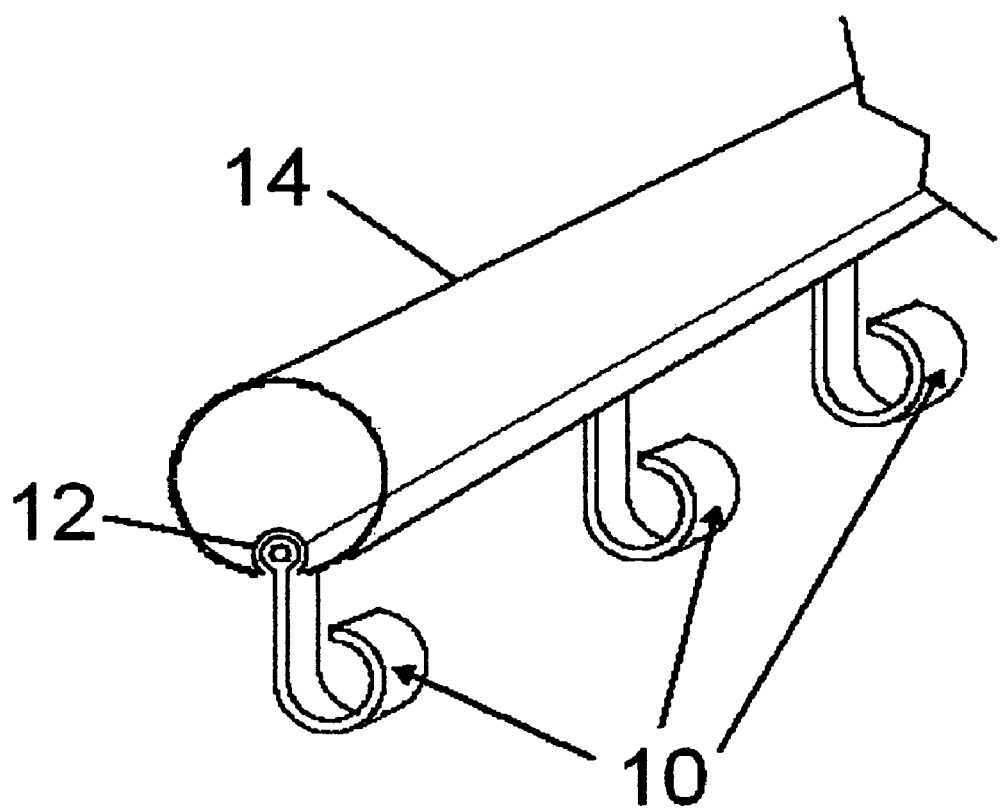
FIG. 3 is a planar view of three apparatuses of the present invention as positioned within an awning roller rail.

FIG. 3 is a planar view of the awning roller rail 14. The awning roller rail 14 shown with three awning hook hangers 10 installed in the utility channel 12.

Figure 4:
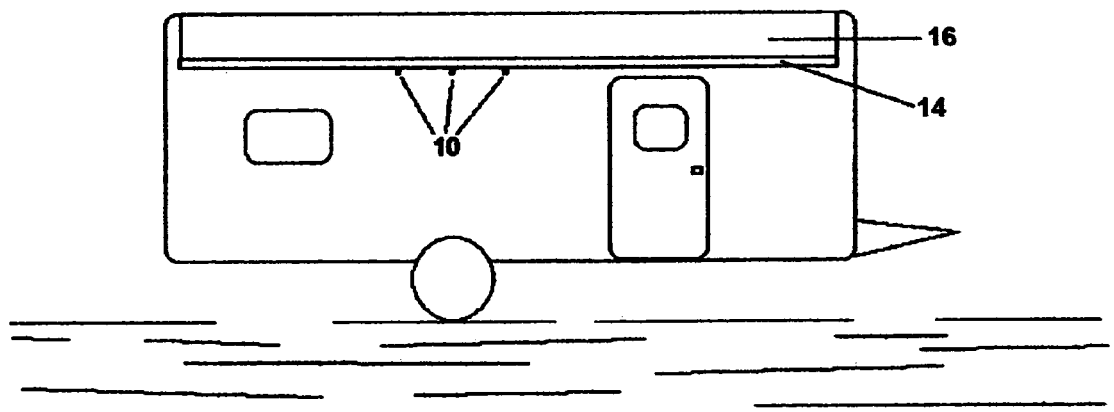
FIG. 4 is a side view of a recreational vehicle with an awning, demonstrating the orientation of the present invention thereon.

FIG. 4 illustrates a front view of a recreational vehicle with an awning deployed. The awning fabric 16 is attached to the awning roller rail 14. FIG. 4 also shows three RV awning hook hangers 10 installed in the awning roller rail 14. It is noted that one or more RV awning hook hangers may be used depending on the needs of the user. The user may want to utilize the RV awning hook hanger singularly to display a windsock or banner, or use several RV hook hangers to support a set of lights or other items. The illustrations and examples provided are for explanatory purposes and are not intended to limit the scope of the appended claims.

What is claimed is:

1. A device for hanging objects there from, suitable for insertion into an awning roller rail having a substantially circular opening on each of two ends and a channel running the length of said awning roller rail, or other like apparatuses, consisting of:
    a body of J-shaped configuration of a predetermined width, having a first end and a downward terminating second end, the second end defining a single plane, and including a U-shaped cradle for receiving objects thereon, and;
    a closed tubular body of a predetermined length having a substantially circular cross-section, fixedly and horizontally mounted to said first end of said J-shaped body, the J-shaped body width extending continuously the entire predetermined length of the tubular body.

2. The device for hanging objects there from of claim 1, wherein said tubular body has a circumference suitable for insertion into said substantially circular opening on an end of an awning roller rail, allowing said body of J-shaped configuration to extend through said channel, without said tubular body passing though said channel.

3. The device for hanging objects there from of claim 1, said body of J-shaped configuration defining a predetermined width being substantially equivalent to said predetermined length of said body of substantially circular cross-section.

* * * * *